United States Patent
Muller et al.

(10) Patent No.: US 10,222,100 B2
(45) Date of Patent: Mar. 5, 2019

(54) MAGNETOCALORIC HEAT APPARATUS

(71) Applicant: COOLTECH APPLICATIONS, Holtzheim (FR)

(72) Inventors: Christian Muller, Strasbourg (FR); Guillaume Brumpter, Entzheim (FR)

(73) Assignee: Cooltech Applications, Holtzheim (FR)

( * ) Notice: Subject to any disclaimer, the term of this patent is extended or adjusted under 35 U.S.C. 154(b) by 136 days.

(21) Appl. No.: 15/038,162

(22) PCT Filed: Dec. 1, 2014

(86) PCT No.: PCT/IB2014/002621
§ 371 (c)(1),
(2) Date: May 20, 2016

(87) PCT Pub. No.: WO2015/079313
PCT Pub. Date: Jun. 4, 2015

(65) Prior Publication Data
US 2016/0298879 A1    Oct. 13, 2016

(30) Foreign Application Priority Data

Nov. 29, 2013 (FR) ...................... 13 61816

(51) Int. Cl.
*F25B 21/00* (2006.01)
(52) U.S. Cl.
CPC ........ *F25B 21/00* (2013.01); *F25B 2321/002* (2013.01); *F25B 2321/0022* (2013.01); *Y02B 30/66* (2013.01)
(58) Field of Classification Search
CPC ................ F25B 21/00; F25B 2321/002; F25B 2321/0022
(Continued)

(56) References Cited

U.S. PATENT DOCUMENTS 9,093,208 B2    7/2015   Muller et al.
2010/0095686 A1   4/2010   Cramet et al.
(Continued)

FOREIGN PATENT DOCUMENTS

FR    2 987 433 A1    8/2013
FR    2 994 018 A1    1/2014
(Continued)

OTHER PUBLICATIONS

International Search Report Corresponding to PCT/IB2014/002621 dated Apr. 21, 2015.
(Continued)

*Primary Examiner* — Filip Zec
(74) *Attorney, Agent, or Firm* — Davis & Bujold PLLC; Michael J. Bujold

(57) ABSTRACT

A magnetocaloric thermal appliance comprising three coaxial magnetic rotors (R1, R2, R3) rotatable about a rotational axis (R), provided with diametrically opposed magnetic poles (P), aligned with each other, and delimiting air gaps therebetween located in two parallel air gap planes (PE1, PE2). Two holders (S1, S2) for magnetocaloric elements (M11, M12, M15, M17, M18) are located in the air gap planes. Magnetocaloric elements (M11, M12, M15, M17, M18) are carried by the two holders (S1, S2) and in fluidic communication with each other by at least one heat transfer fluid that circulates in determined fluidic loops (B1). Each fluidic loop (B1) is arranged for connecting, two by two, magnetocaloric elements (M11, M12; M17, M18) that respectively belong to the two holders (S1, S2). The magnetocaloric elements connected two by two are in a same magnetic state and positioned in front of each other.

11 Claims, 11 Drawing Sheets

(58) Field of Classification Search
USPC .......................................................... 62/3.1
See application file for complete search history.

(56) References Cited

U.S. PATENT DOCUMENTS

| | | |
|---|---|---|
| 2011/0041514 A1 | 2/2011 | Heitzler et al. |
| 2011/0067415 A1 | 3/2011 | Mao et al. |
| 2014/0290275 A1 | 10/2014 | Muller |
| 2015/0168030 A1* | 6/2015 | Leonard .................. F25B 21/00 62/3.1 |

FOREIGN PATENT DOCUMENTS

| | | | |
|---|---|---|---|
| JP | 04240361 A * | 8/1992 | .............. F25B 21/00 |
| WO | 2013/076571 A1 | 5/2013 | |

OTHER PUBLICATIONS

Written Opinion Corresponding to PCT/IB2014/002621 dated Apr. 21, 2015.

* cited by examiner

MAGNETOCALORIC HEAT APPARATUS

TECHNICAL SCOPE

The present invention relates to a magnetocaloric thermal appliance including at least:
- three coaxial magnetic rotors, coupled with an actuator so as to be rotatable about a rotational axis, of which two magnetic rotors are single-faced and a central magnetic rotor arranged between the two others is double-faced, said magnetic rotors being provided with diametrally opposed magnetic poles, aligned with each other, and delimiting between each other air gaps located in two parallel air gap planes,
- two magnetocaloric element holders located in said air gap planes,
- magnetocaloric elements carried by said two holders and in fluidic communication with each other by means of fluidic connections wherein at least one heat transfer fluid circulates and forming at least one determined fluidic loop, and
- means for circulating said heat transfer fluid in said fluidic loop through said magnetocaloric elements according to a reciprocating forth and back movement in function of the magnetic cycles created by said magnetic rotors.

PRIOR ART

Magnetic refrigeration technology at ambient temperature has been known for more than thirty years and its advantages in terms of ecology and sustainable development are widely acknowledged. Its limits in terms of its useful calorific output and its thermal performance are also well known. Consequently, all the research undertaken in this field tends to improve the performances of the magnetocaloric thermal appliances, by adjusting the various parameters, such as the intensity of the magnetic field, the performances of the magnetocaloric material, the heat exchange surface between the heat transfer fluid and the magnetocaloric elements, the performances of the heat exchangers, etc.

Today, the developments aim at optimizing the appliances in order, on the one hand, to be able to manufacture them in large series and, on the other hand, to ensure them a long service life. Moreover, an additional element is to be taken into consideration in the design of this type of magnetocaloric thermal appliances, which relates to their compactness, indispensable in many fields of application, in fact, in addition to the need for a usable energy efficiency, a magnetocaloric thermal appliance must also have a relatively reduced size or volume, allowing for example to integrate it in a household appliance, a vehicle, etc., already existing on the market or new.

A magnetocaloric thermal appliance is made of several elements, which are indispensable for its operation. Among these indispensable materials, there are the so-called magnetocaloric materials, whose temperature varies according to the magnetic field they are subjected to. More specifically, the magnetocaloric material warms up almost instantly when it is placed in a magnetic field or subjected to an intense magnetic field, and it cools down according to a same thermal dynamics when it is removed from the magnetic field or subjected to a low magnetic field. The magnetic field variation is generated by a magnetic system or arrangement that forms another essential element and that can be formed for example either by electromagnets powered by a variable current or by an assembly of permanent magnets in relative movement with respect to the magnetocaloric materials. The higher the quantity of magnetocaloric material in a thermal appliance, the higher the thermal output of this appliance may be.

A liquid or gaseous heat transfer fluid is used to extract the energy of the magnetic phases or cycles, which include each a magnetization and a demagnetization. This heat transfer fluid is circulated to enter into thermal contact with said magnetocaloric materials, so that it heats up on contact with the magnetocaloric material during a so-called magnetization phase and cools down on contact with the magnetocaloric material during a so-called demagnetization phase. Classically, the heat transfer fluid circulates in rectilinear channels or through pores already existing or created in the magnetocaloric material. This circulation corresponds to a hydraulic flow of the fluid, preferably in laminary mode, in order to obtain a maximum exchange surface with a minimum hydraulic head loss.

Finally, in order to be able to operate the magnetocaloric thermal appliance, the latter must be thermally connected, directly or through heat exchangers, with the environment or with the application towards which the produced thermal energy is to be exchanged and/or evacuated.

The current needs in the field of magnetocaloric thermal appliances concentrate on design and assembly simplicity and on the reduction of the size of such appliances.

To that purpose, the applicant developed a magnetocaloric thermal appliance as schematically illustrated in FIGS. 1, 2 and 3, with reference to publication WO 2013/076571. FIG. 1 represents a fluidic loop at an instant t connecting magnetocaloric elements M1, M2, M7, M8 and M3, M4, M5, M6, mounted respectively on two holders SUP1 and SUP2. The magnetocaloric elements M3, M4, M8, M7 subjected to a magnetic field are represented by a hatched rectangle and the magnetocaloric elements M1, M2, M6, M5 located outside the magnetic field are simply represented by a rectangle. The interest of connecting two magnetocaloric elements M1 and M2, M3 and M4, M5 and M6, M7 and M8, which are in a same magnetic state—that is to say both subjected to a magnetic field or not—between a heat exchanger EC1 or EC2 and a fluid actuator A1 or A2 is that his allows increasing the temperature gradient obtained in steady operation between the hot end C and the cold end F of the magnetocaloric thermal appliance. In this appliance, the magnetic field is obtained thanks to two magnetic units comprising each two rotating magnetic rotors on which permanent magnets AP are mounted (see FIG. 2). Therefore, the appliance comprises a total of four magnetic rotors. The permanent magnets of every magnetic unit form two poles P1, P2 arranged substantially at 180° from each other, in other words, diametrally opposed with respect to the rotational axis X of said magnetic units. The two magnetic units are offset on the same rotational axis X by an angle of 90 degrees, as shown in FIG. 2. Logically, the device that circulates the heat transfer fluid in the fluidic circuit that connects the magnetocaloric elements of the two holders SUP1 and SUP2 is arranged between the two magnetic units. The main disadvantage of its presence is that it increases the volume of the magnetocaloric thermal appliance (along the longitudinal axis X—refer in particular to FIG. 2). This device in particular comprises a control cam CC rotatably mounted on rotational axis X arranged to move the pistons of actuators A1, A2.

FIG. 3 is a view representing the holders SUP1 and SUP2 of the magnetocaloric elements seen along planes A and B of FIG. 2 and in fluidic communication with each other through pipes forming a fluidic circuit. It is to be noted that the implementation of the fluidic circuit is complex and cumbersome and that the length of the required pipes is also very important. It is in particular visible that four pipes identified by a fine dot-dash line run each along half of the circumference of holders SUP1, SUP2. These four pipes correspond to the fluidic connection of magnetocaloric elements of a same holder SUP1, SUP2 which are in a same magnetic state (M8 and M7, M1 and M2; M4 and M3, M6 et M5). The direct consequence of these important pipe lengths is a head loss leading to a decrease of the efficiency of the appliance and a loss of output, as the heat transfer fluid contained in the fluidic connections is not entirely exploited because of a high dead volume, and it is moreover liable to generate thermal losses by increasing the exchange surfaces with the environment.

In order to reduce the size of this magnetocaloric thermal appliance, the applicant developed a magnetic generator comprising three coaxial and parallel magnetic rotors instead of four, which delimit between each other two parallel air gaps. This arrangement has the advantage of reducing the volume and the weight of the thermal appliance in comparison with that described in reference to FIGS. 1 to 3. An example of such a magnetic system is described in publication FR 2 987 433 (see in particular FIG. 6) and in French patent application FR 12/57323 (see in particular FIG. 12) filed by the applicant. However, the heat transfer fluid distribution circuit as described in the appliance of FIGS. 1 to 3 is not compatible with a magnetic system with three magnetic rotors. In fact, in such a configuration, the magnetocaloric elements arranged substantially in front of each other, in the two holders located in the air gaps, are all in a same magnetic state, as the magnetic poles formed by the magnetic rotors are obligatorily aligned. Conversely, in the previous configuration comprising two distinct magnetic units, the magnetic poles could be offset or phase-shifted by 90° for example, generating an angular offset in the magnetization state of the magnetocaloric elements arranged substantially in front of each other.

Moreover, publication US 2011/0067415 A1 describes a magnetocaloric thermal appliance comprising several stages of magnetocaloric elements between several stages of magnetic rotors. However, the magnetocaloric elements are connected to each other in parallel and are integrated in one single fluidic loop.

DESCRIPTION OF THE INVENTION

The present invention aims to offer a magnetocaloric thermal appliance comprising three aligned coaxial magnetic rotors that form two air gap planes in which holders comprising magnetocaloric materials are placed, this appliance showing an optimized size, and in which the hydraulic circuit and its driving system are easy to implement.

This goal is achieved by a magnetocaloric thermal appliance of the kind described in the preamble, characterized in that said fluidic connections connect serially two by two in said fluidic loop magnetocaloric elements that belong respectively to the two holders, said magnetocaloric elements connected two by two being in a same magnetic state and positioned in front of each other.

Such a configuration or rotary structure wherein the magnetic system is in relative movement with respect to the magnetocaloric elements has the advantage of showing a good magnetocaloric material/used volume ratio. Since the thermal output of the thermal appliance depends in particular on the quantity of magnetocaloric material used, such arrangement is actually very advantageous.

According to the invention, every fluidic loop can comprise first magnetocaloric elements of every holder in an identical magnetic state and second magnetocaloric elements of every holder in a reversed magnetic state, and said displacement means can be diametrally opposed and arranged for displacing the heat transfer fluid in two opposite directions.

Said displacement means comprise advantageously actuators positioned centrally with respect to the median plane of the thermal appliance passing through the central magnetic rotor.

In order to optimize the size of the appliance, said central magnetic rotor can comprise at least one means for controlling said actuators.

Moreover, the means for controlling the actuators can comprise two cam profiles, each cam profile being arranged for driving one of the two actuators of every fluidic loop. In other words, a part of the actuators is driven by one cam profile and the other part of the actuators of the appliance is driven by the other cam profiles.

According to the invention, the cam profiles can be identical, but offset by an angle of 90° about the rotational axis.

Of course, the appliance according to the invention can preferably comprise several fluidic loops and the actuators associated with the fluidic loops can be uniformly distributed about the rotational axis.

According to the invention, the magnetocaloric elements carried by said holders can be arranged symmetrically with respect to the median plane of the thermal appliance that passes through the central magnetic rotor.

All fluidic loops of the thermal appliance can be in fluidic communication with a common heat exchanger at the level of the cold side of the thermal appliance and/or with a common heat exchanger at the level of the hot side of the thermal appliance. As a variant, each fluidic loop can be in fluidic communication with a heat exchanger that is associated to it at the level of the cold side of the thermal appliance and/or with a heat exchanger that is associated to it at the level of the hot side of the thermal appliance.

According to the invention, each rotor can moreover comprise at least two pairs of magnetic poles. They can for example comprise four or six poles, that is to say two or three pairs or diametrally opposed poles.

The heat transfer fluid is preferably a liquid. To that purpose, it is possible for example to use pure water or water with antifreeze, a glycolated product or a brine.

BRIEF DESCRIPTION OF THE DRAWINGS

The present invention and its advantages will be better revealed in the following description of embodiments given as non limiting examples, in reference to the drawings in appendix, in which.

ILLUSTRATIONS OF THE INVENTION AND VARIOUS WAYS OF REALIZING IT

In the illustrated embodiment examples, the identical pieces or parts have the same numerical references.

The drawings of FIGS. 4 to 10 represent two embodiment variants of a magnetocaloric thermal appliance 1, 1' according to the invention. It comprises a magnetic system with three magnetic rotors R1, R2, R3 that, due to their rotation about rotational axis R, subject magnetocaloric elements M11, M12, M13, M14, M15, M16, M17, M18 to a magnetic field variation. The magnetic rotors R1, R2, R3 comprise magnetic poles. In the example, each rotor R1, R2, R3 comprises two diametrally opposed magnetic poles. Moreover, the poles of rotors R1, R2, R3 are mounted aligned with each other. They allow creating in the appliance four air gaps diametrally opposed two by two and aligned two by two, located in two air gap planes PE1, PE2. The magnetic rotors R1, R2, R3 comprise each a frame T1, T2, T3 on which permanent magnets AP1, AP2, AP2 are mounted, which are liable to be associated with ferromagnetic elements to form the magnetic poles. More specifically, the two magnetic end rotors R1 and R3 are called single-faced, that is to say that they comprise magnets only on one side, and the central magnetic rotor R2 is called double-faced, that is to say that it comprises magnets on both sides or through magnets. Magnetocaloric elements M11, M12, M13, M14, M15, M16, M17, M18 are mounted in two fixed holders S1, S2 positioned in air gap planes PE1, respectively PE2, and are therefore coaxial and parallel to each other.

Even though the present description presents magnetic rotors provides with two poles, the invention is not restricted to this number of poles. It is of course possible to consider rotors comprising more poles, for example four poles diametrally opposed two by two.

For the purpose of this invention, a magnetocaloric element may comprise one or several types of magnetocaloric materials. A magnetocaloric element can for example comprise several parts provided with channels for the passage of the heat transfer fluid, said parts being contiguous or separated by a blocking element or by a heat transfer fluid guiding element that however allows a direct fluidic communication. A magnetocaloric element can for example be made of a succession of magnetocaloric material sections arranged on or in a same holder S1 or S2 and in fluidic communication with each other.

The appliance according to the invention comprises at least one fluidic loop B1, B2, B3 passing through the magnetocaloric elements. Each fluidic loop comprises fluidic communications connecting serially hydraulically several magnetocaloric elements and in which at least one heat transfer fluid circulates. The heat transfer fluid is displaced in each fluidic loop by suitable displacement means, as explained later.

Figure 1:
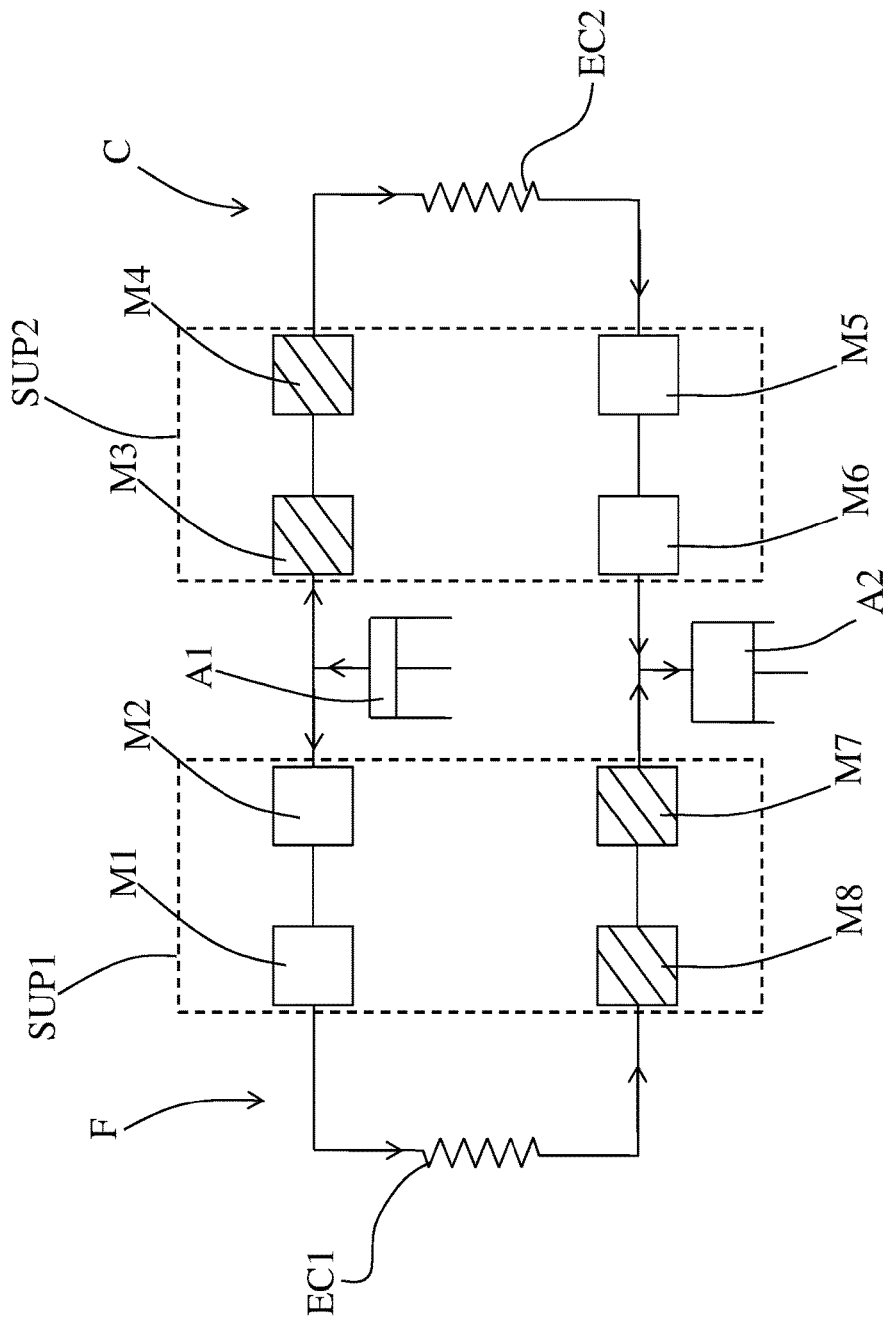
FIG. 1 is a schematic view of a fluidic loop of a magnetocaloric thermal appliance according to the prior art.
Figure 2:
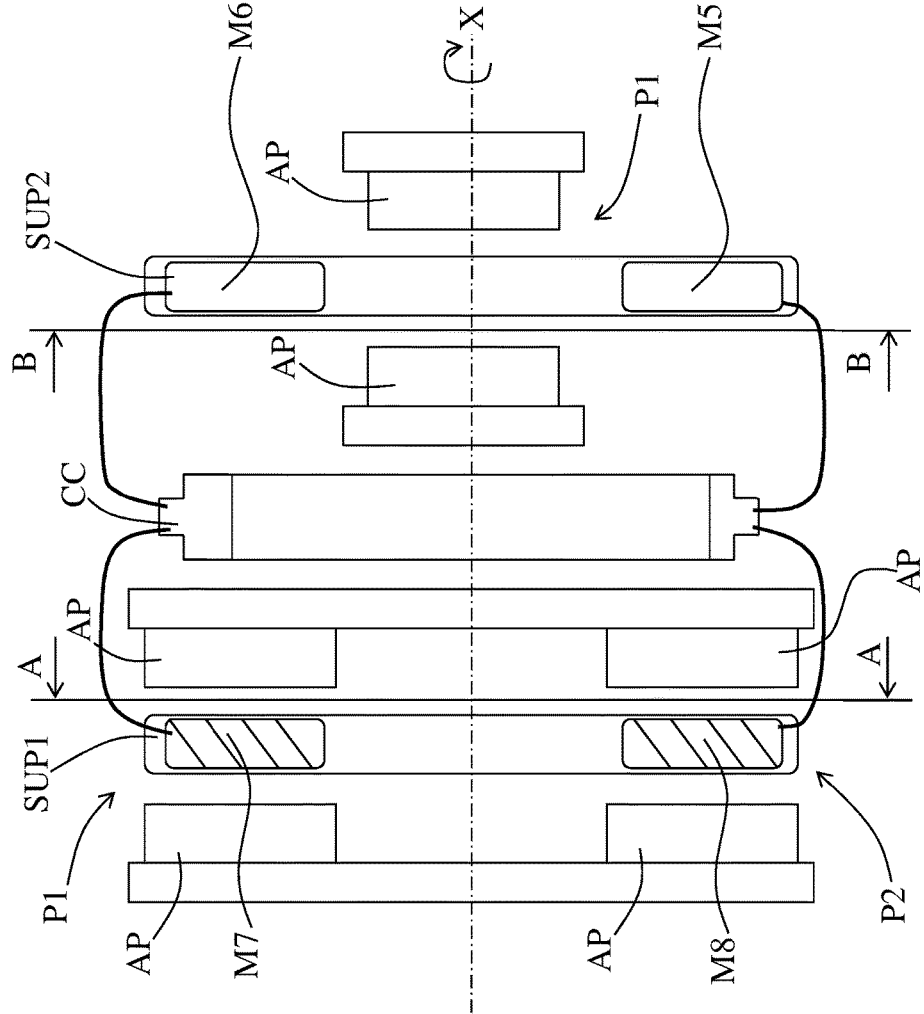
FIG. 2 is a schematic axial cross-sectional view of the appliance according to the prior art that corresponds to the fluidic loop of FIG. 1.
Figure 4:
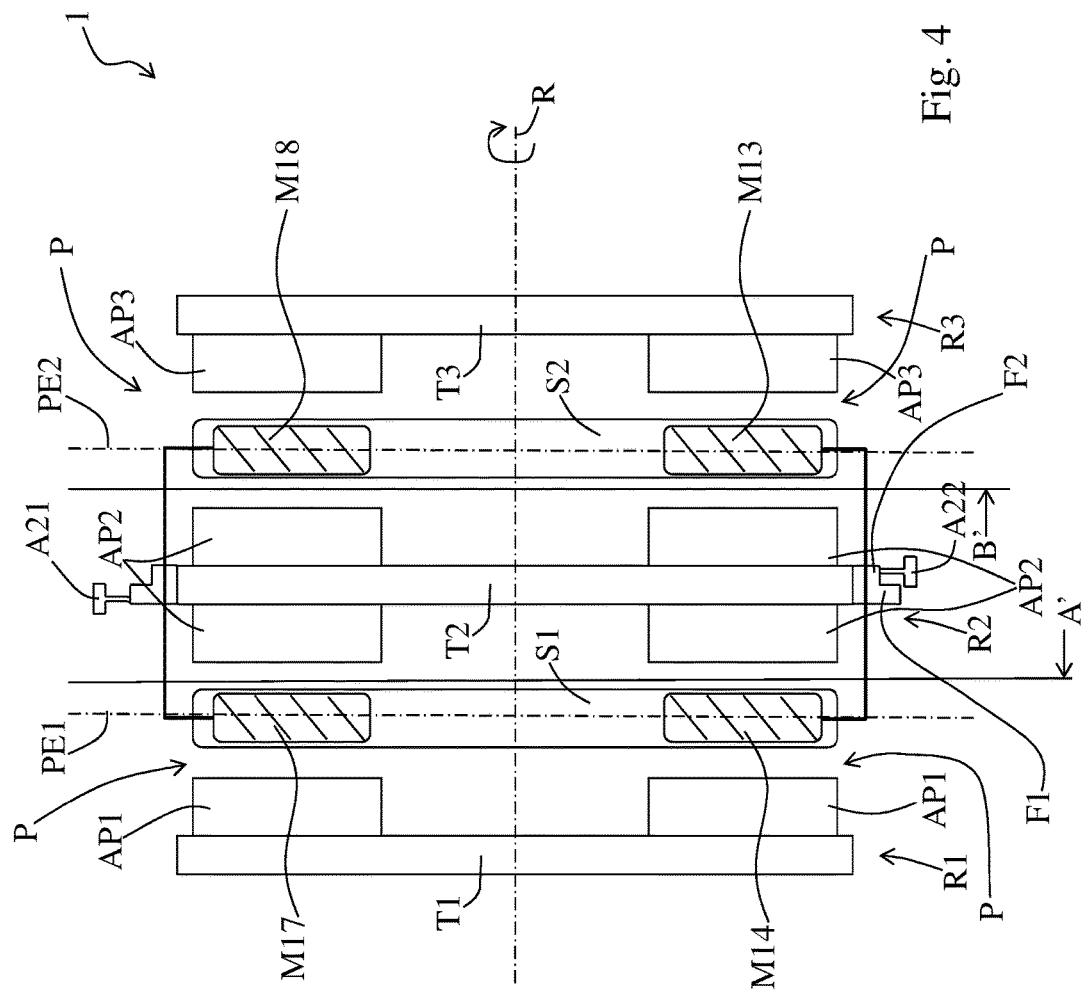
FIG. 4 is a schematic axial cross-sectional view of a thermal appliance according to the invention.

In the magnetocaloric elements, the heat transfer fluid circulates from their cold end F towards their hot end C during a first phase of the magnetic cycle, which corresponds to a heating phase during which the magnetocaloric elements are positioned in an air gap and are subjected to a magnetic field leading to an increase of their temperature, and then from their hot end C towards their cold end F during a second phase of the magnetic cycle, which corresponds to a cooling phase during which the magnetocaloric elements are positioned outside an air gap and are subjected to a zero magnetic field leading to a decrease of their temperature In order to realize the hydraulic diagram illustrated in FIG. 1 on an appliance configuration as that of FIG. 4, both optimizing the length of the required fluidic connections and reducing the volume of the appliance, the applicant went against a prejudice that consists in positioning on the one hand the magnetocaloric elements connected to hot exchanger EC2 of the appliance on a holder SUP2 close to hot side C and, on the other hand, arranging the magnetocaloric elements connected to cold exchanger EC1 on a holder SUP1 close to cold side F, and therefore connecting directly fluidically to each other magnetocaloric elements that are in a same magnetic state and belong to a same holder.

Figure 5:
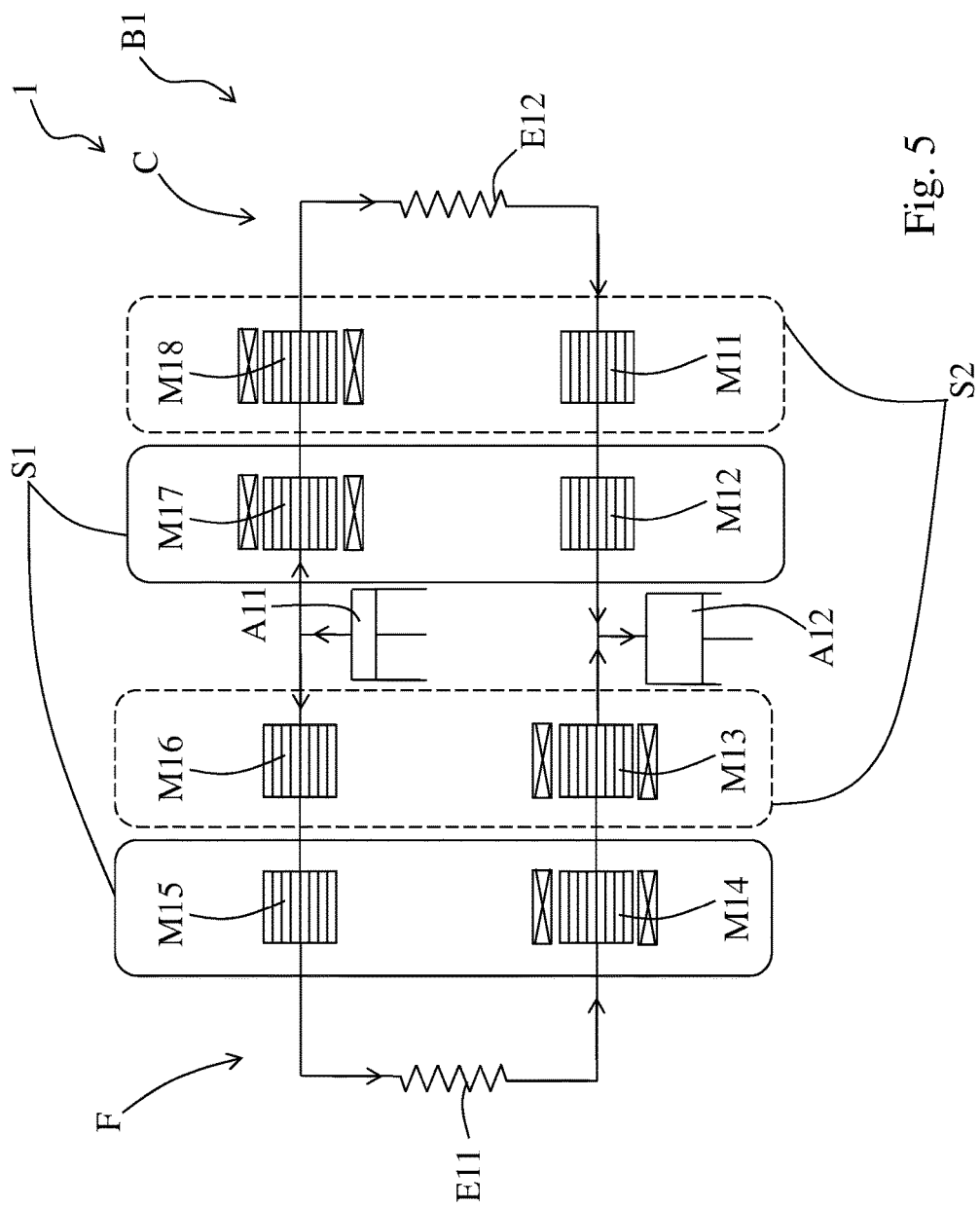
FIG. 5 is a schematic view of a fluidic loop of the appliance of FIG. 4.
Figure 7:
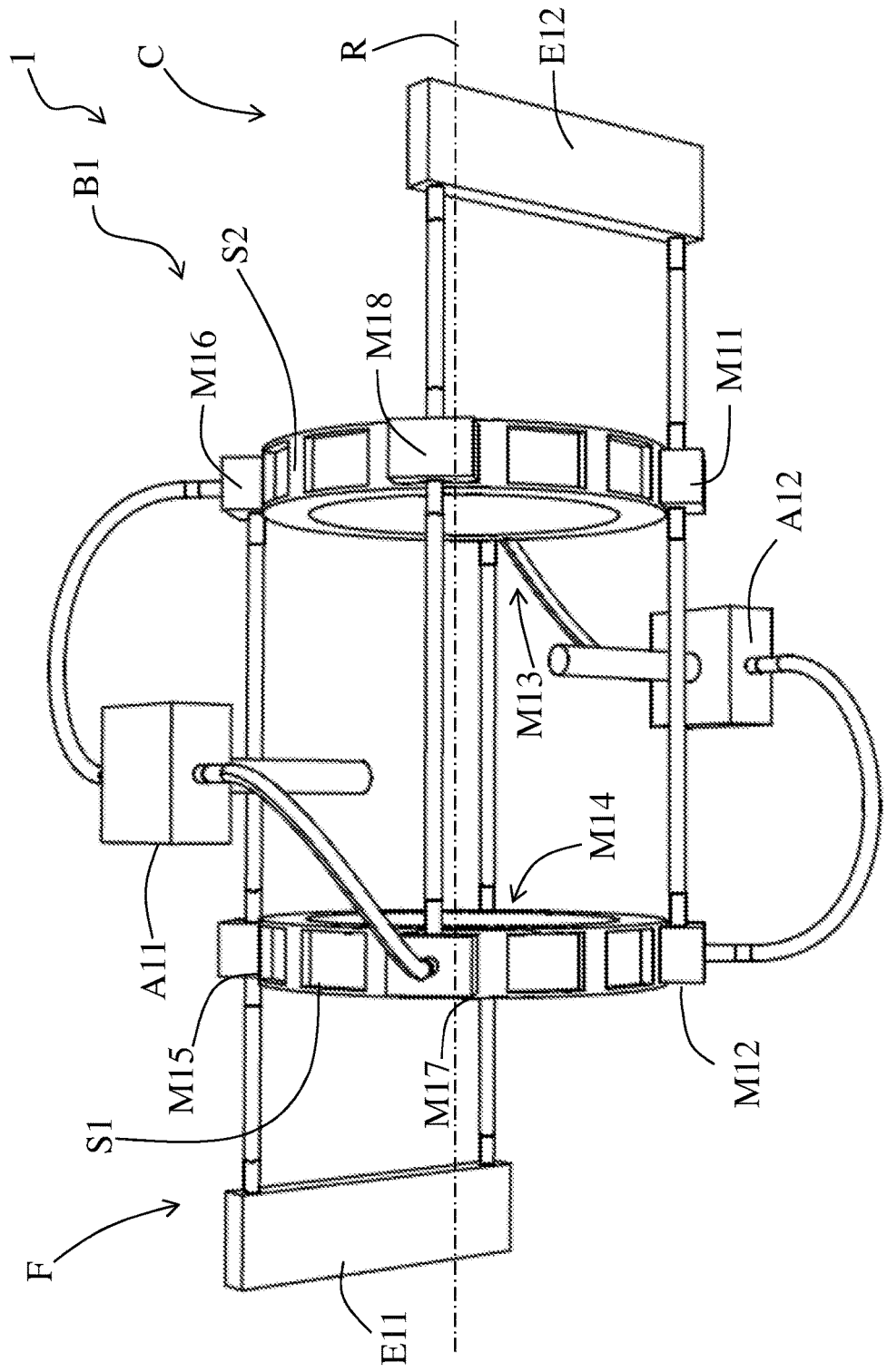
FIG. 7 is a perspective view of the appliance of FIG. 4 showing a fluidic loop, wherein the magnetic rotors are not represented.
Figure 8:
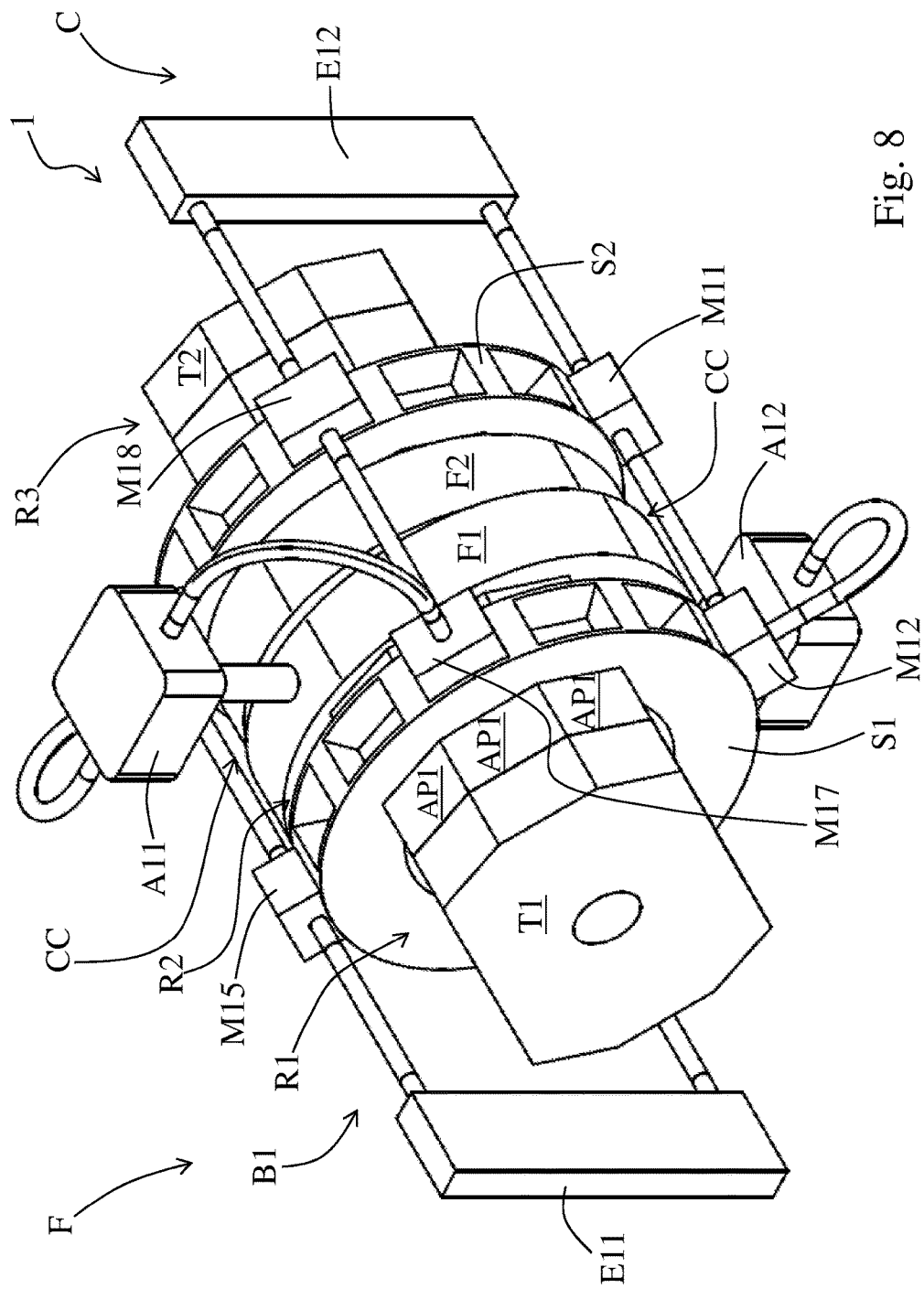
FIG. 8 is a view identical that of FIG. 7, wherein the magnetic rotors are represented.

In fact, referring to FIG. 5, in appliance 1 according to the invention, a fluidic loop B1 that connects serially by fluidic connections eight magnetocaloric elements M11, M12, M13, M14, M15, M16, M17, M18, connects respectively four magnetocaloric elements M12, M14, M15, M17 of a first holder S1 directly to four magnetocaloric elements, respectively M11, M13, M16, M18 of second holder S2, said magnetocaloric elements being arranged on front of each other and in a same magnetization state. Hot side C of appliance 1 is located on the right in FIGS. 5 and 7, at the level of hot exchanger E12, and cold side F of the appliance is located on the left, at the level of cold exchanger E11. Referring to the diagram of FIG. 5, FIG. 7 shows clearly that the magnetocaloric elements M13, M14, M15, M16 are connected to the cold side or cold exchanger E11 of appliance 1, but distributed on both holders S1, S2, while the holder located on the cold side is holder S1. The same applies to magnetocaloric elements M11, M12, M17, M18 distributed in both holders S1, S2, but connected to hot exchanger E12 of hot side C of appliance 1, while the holder located on the hot side is holder S2.

Figure 3:
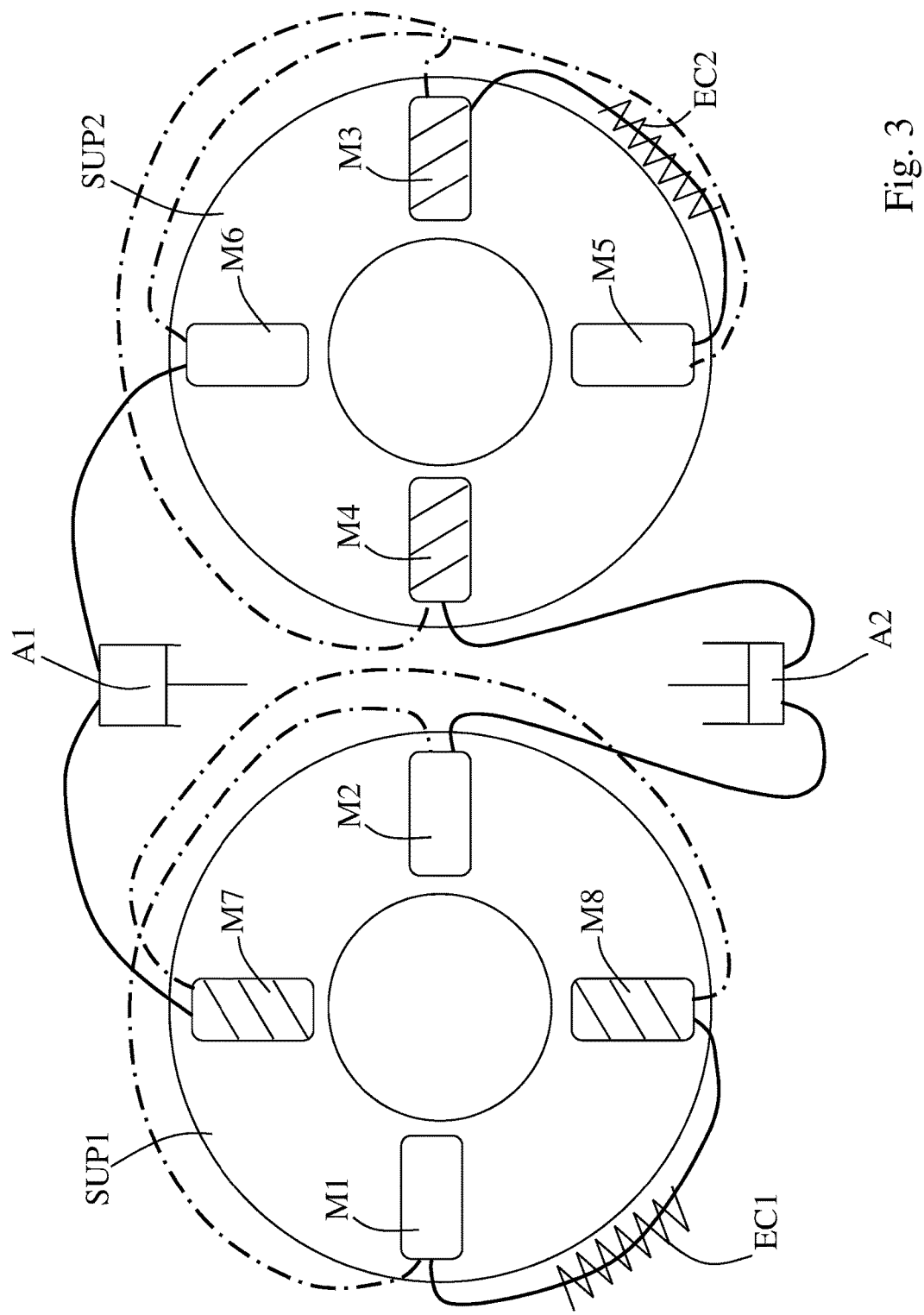
FIG. 3 represents the whole of the fluidic communications or pipes of a fluidic loop of the appliance of FIG. 2, illustrating the holders of the magnetocaloric elements seen in a front view according to planes A and B FIG. 2.

Such an arrangement allows reducing considerably the length of the fluidic connections or pipes required for closing the fluidic loop, in particular by dividing the length by three with respect to the classical system as represented in FIG. 3. This result is surprising as, ultimately, a fluidic loop performs six passages from one holder S1, S2 to the other holder S2, S1, that is to say, four direct passages between magnetocaloric elements and two passages through actuators A11, A12. Such shortening of the length of the fluidic loops is also possible thanks to the integration on central magnetic rotor R2 of a control cam CC for actuators A11, A12 or pistons. This construction allows bringing together as close as possible magnetocaloric elements holders S1, S2 and arranging control cam CC of actuators A11, A12 outside of the axial space of magnetocaloric thermal device 1. This construction also allows driving control cam CC in rotation about rotational axis R. At the same speed as magnetic rotors R1, R2, R3, directly synchronized with the magnetization variations.

In order to allow displacing the heat transfer fluid so that, when a magnetocaloric element is subjected to heating, the heat transfer fluid is directed towards hot exchanger E12 and, when it is subjected to cooling, the heat transfer fluid is directed towards cold exchanger E11, control cam CC comprises two identical cam profiles F1, F2 offset angularly by 90° about axis R. An angular offset is necessary and it is due to the position of the actuators. It is in fact necessary that, in a same fluidic loop, an actuator is in one state and the other actuator is in the opposite or complementary state. Since the fluidic loop is closed, the fluid of the fluidic loop must be able to flow without fluid compression. In the illustrated example, this offset between the profiles is 90° (which corresponds to the 180° phase shift between the actuators of a fluidic loop divided by the number of magnetic poles, here two magnetic poles) because two actuators of a same fluidic loop are positioned at 180° and the control cam is defined to coincide with two magnetic cycles.

As a general rule, each fluidic loop B1, B2, B3 connects serially magnetocaloric elements belonging to the two holders S1, S2. Moreover, the drive or distribution of the heat transfer fluid through the fluidic connections of a fluidic loop B1, B2, B3 is central and positioned in the median plane of second magnetic rotor R2, between the two holders S1 and S2 which are arranged symmetrically with respect to said median plane. A fluidic loop B1, B2, B3 comprises a hot side and a cold side. The hot side of the fluidic loop is connected thermally to a hot heat exchanger E12 and the cold side is connected thermally to a cold heat exchanger E11. Without considering magnetic rotors R1, R2, R3, holders S1 and S2 are each arranged in the thermal appliance between the central distribution and one of said heat exchangers E11, E12. The magnetocaloric elements M17, M18, M12, M11 arranged in the hot side of fluidic loop B1, B2, B3 are mounted in the two holders S1 and S2. Likewise, the magnetocaloric elements M15, M16, M14, M13 arranged in the cold side of fluidic loop B1, B2, B3 are mounted in the two holders S1 and S2. In other words, each holder S1, S2 comprises both magnetocaloric elements M14, M15; M16, M13 that belong to the cold side of the fluidic loop and magnetocaloric elements M17, M12; M18, M11 that belong to the hot side of the fluidic loop, even though holder S1 is located on the hot side of the thermal appliance and holder S2 is located on the cold side of the thermal appliance. A dissociation is achieved between the hot side and the cold side of fluidic loops B1, B2, B3 and the hot side and the cold side of the thermal appliance.

In a non illustrated embodiment variant, wherein the rotors have four poles and wherein the two actuators of a same fluidic loop are positioned at 180°, the profiles of the two cams are also identical to each other, but different from those of the two-pole variant. In such a configuration, the angular offset between the cam profiles would be 45°.

Referring to the illustrated variant, it appears clearly on FIGS. 4 and 7 that the two actuators A21, A22 of a same fluidic loop B2 located in two opposite positions are not located in a same plane, in order to be driven by two different devices such as the two cam profiles F1 and F2. FIG. 4 shows the direct fluidic connection between magnetocaloric elements M17, M18, and M14, M13 of a fluidic loop B1. It illustrates the actuators A21 and A22 of another fluidic loop B2, however without illustrating the magnetocaloric elements of this fluidic loop B2, nor the fluidic connections.

Figure 6:
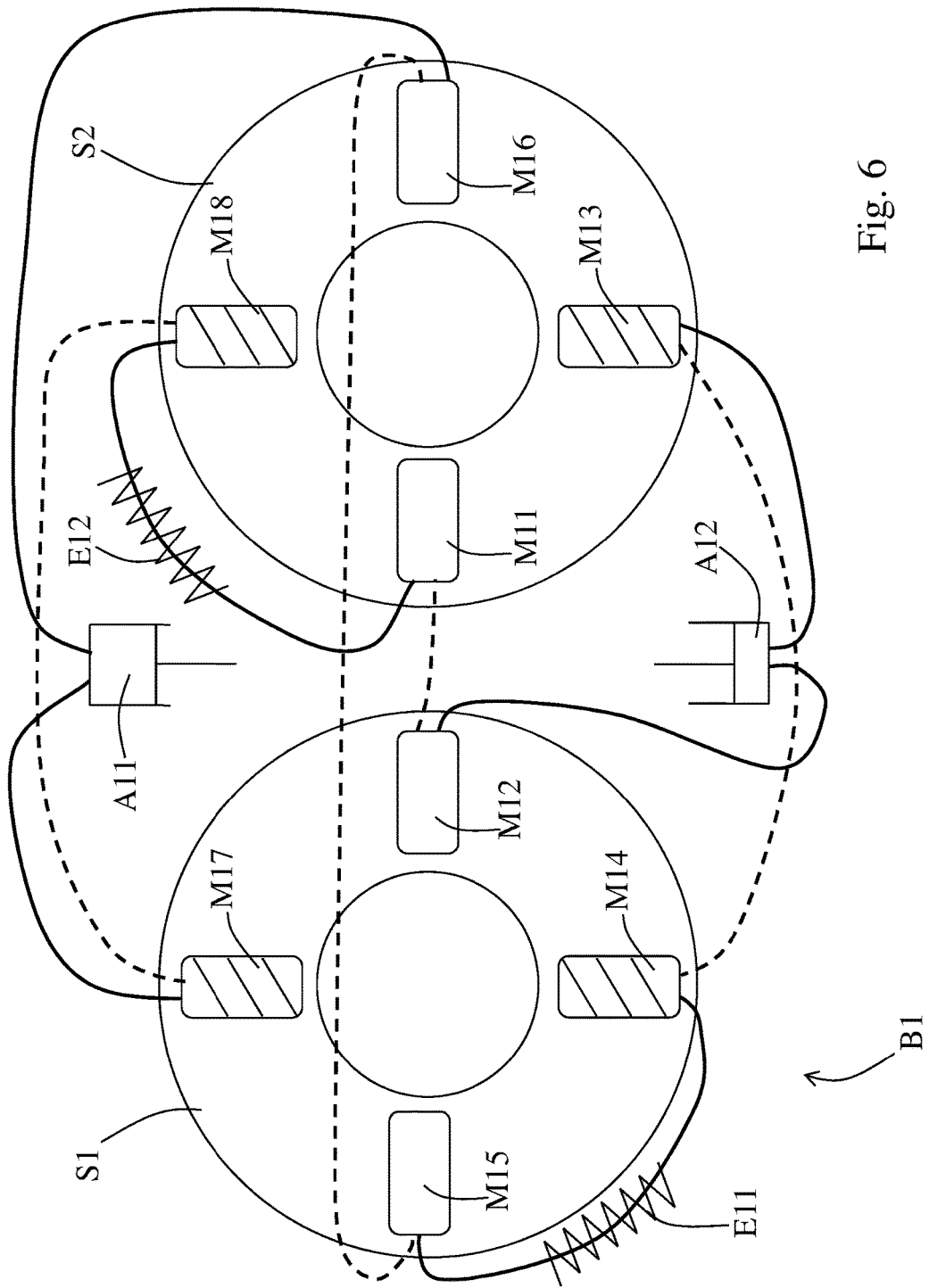
FIG. 6 represents the whole of the fluidic communications of a fluidic loop of the appliance of FIG. 4, illustrating the holders of the magnetocaloric elements seen in a front view according to planes A' and B' of FIG. 4.

FIG. 6 represents schematically fluidic loop B1 at an instant t at which magnetocaloric elements M17, M18, M14 and M13 are magnetized and magnetocaloric elements M15, M16, M11, M12 are demagnetized. This FIG. 6 represents the fluidic connections of fluidic circuit B1, magnetocaloric elements holders S1, S2 seen in a front view according to planes A' and B' of FIG. 4. The dotted lines illustrate the direct fluidic connections between magnetocaloric elements arranged in front of each other and in a same magnetic state. These connections are therefore very short, as holders S1, S2 are separated only by central magnetic rotor R2. In the prior art, the two holders SUP1 SUP2 were separated by the distribution system and two magnetic rotors. Actuators A11, A12, connect to each other two magnetocaloric elements M16, M17; M13, M12 offset by an angle of 90°. Likewise, heat exchangers E11, E12 connect magnetocaloric elements M14, M15; M11, M18 offset by an angle of 90°. These are the longest connections. In comparison, the fluidic loops of the prior art comprise six connections connecting magnetocaloric elements located at 180° from each other, requiring much higher pipe lengths (more than three times more).

FIG. 7 represents fluidic loop B1 of FIG. 5 in a magnetocaloric thermal appliance 1. In this simplified illustration, magnetic rotors R1, R2, R3 and drive cam CC for actuators A11, A12 are not represented. Moreover, to facilitate understanding, the distances between the various components of fluidic loop B1 have been exaggerated, therefore increasing the length of the fluidic connections. Referring to FIGS. 5 to 9, fluidic loop B1 connects by means of fluidic connections magnetocaloric elements arranged in the two holders S1, S2, in the following order, that is to say, a first magnetocaloric element M11 of second holder S2 is serially connected directly to a first magnetocaloric element M12 of first holder S1, arranged in front and in a same magnetic state, which is connected through actuator A12 to a second magnetocaloric element M13 of second holder S2, this second magnetocaloric element M13 being in a reversed magnetic state with respect to that of first magnetocaloric elements M11 and M12 and offset by an angle of 90° on rotational axis R with respect to the latter, this second magnetocaloric element M13 of second holder S2 being serially connected directly to a second magnetocaloric element M14 of first holder S1, arranged in front and in a same magnetic state, which is connected through heat exchanger E11 to a third magnetocaloric element M15 of first holder S1, in a reversed magnetic state and offset by an angle of 90°, this third magnetocaloric element M15 being serially connected directly to a third magnetocaloric element M16 of second holder S2, arranged in front and in a same magnetic state, which is connected through actuator A11 to a fourth and last magnetocaloric element M17 of first holder S1, this last magnetocaloric element M17 being in a reversed magnetic state with respect to that of third magnetocaloric elements M15 and M16 and offset by an angle of 90° on rotational axis R with respect to the latter, this fourth and last magnetocaloric element M17 of first holder S1 being serially connected directly to a fourth and last magnetocaloric element M18 of second holder S2, arranged in front and in a same magnetic state, this fourth and last magnetocaloric element M18 of second holder S2 being connected through heat exchanger E12 to first magnetocaloric element M11 of second holder S2, therefore closing fluidic loop B1.

Actuators A11 and A12 constantly displace the heat transfer fluid in fluidic loop B1 simultaneously and in opposite directions. At the instant t represented in FIG. 5, actuator A11 pushes the heat transfer fluid and actuator A12 sucks the heat transfer fluid. Of course, the heat transfer fluid is preferably incompressible.

Figure 9:
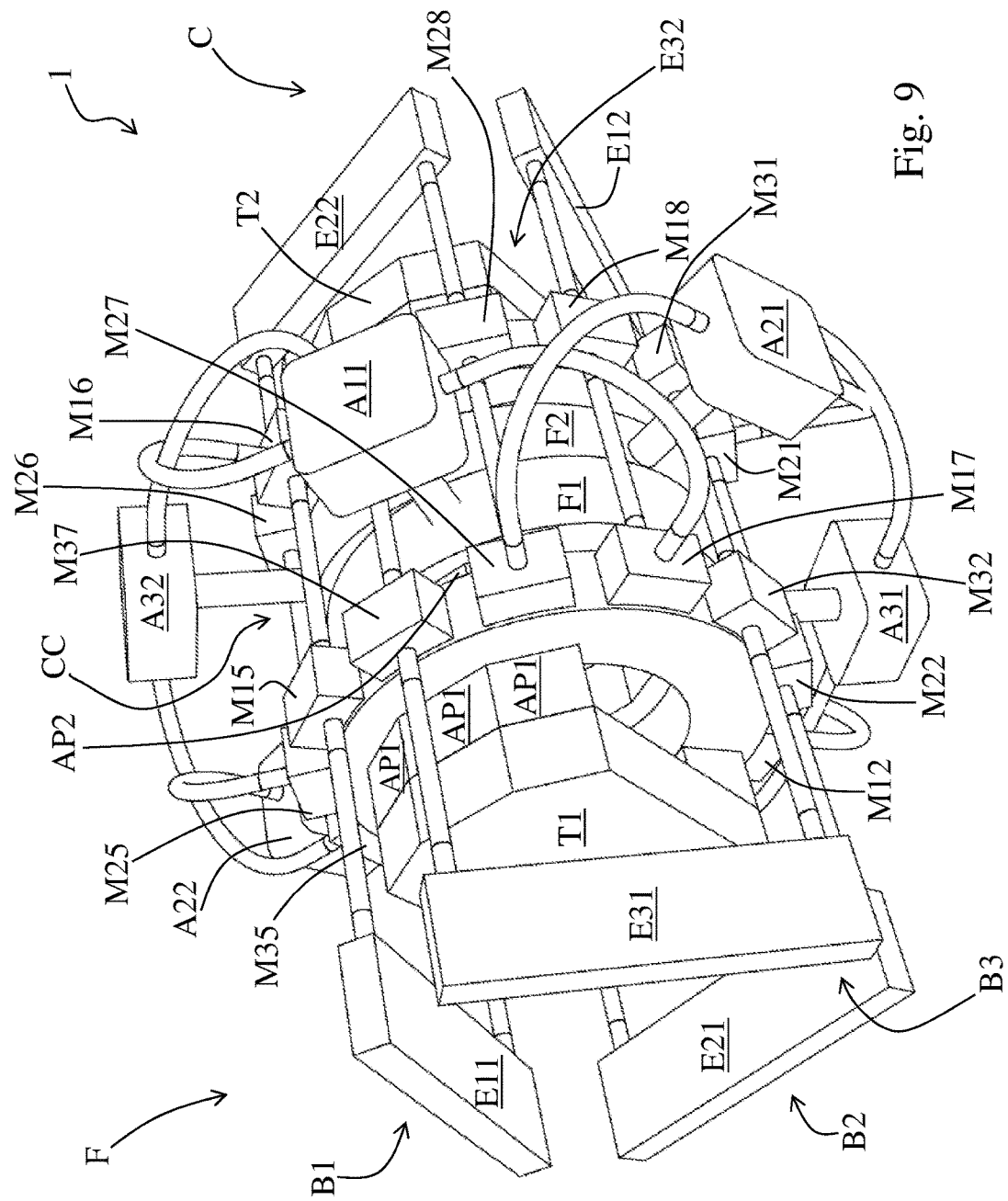
FIG. 9 is a perspective view of the appliance of FIG. 4 showing several fluidic loops.
Figure 11:
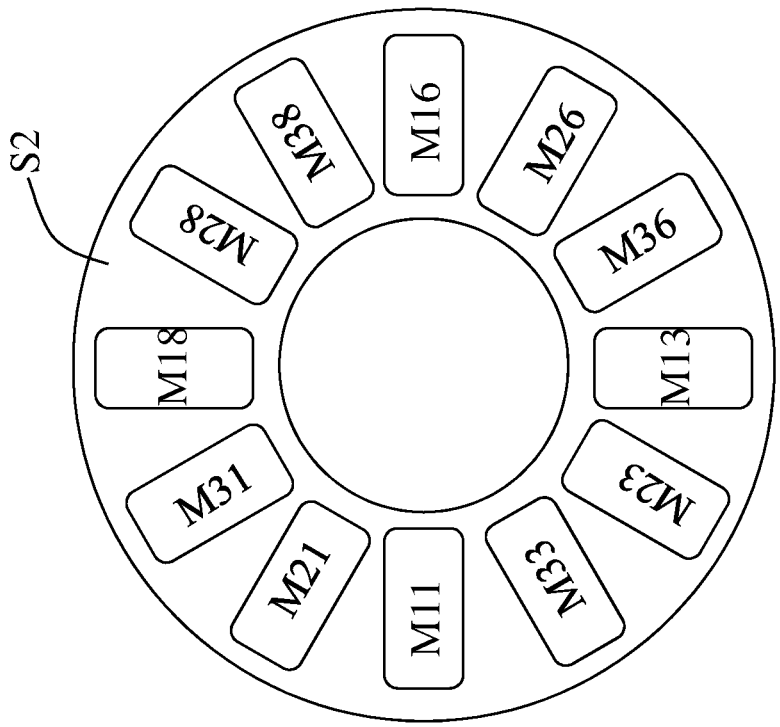
FIG. 11 represents the two magnetocaloric elements holders in a front view according to planes A' and B' of FIG. 4.
Figure 11:
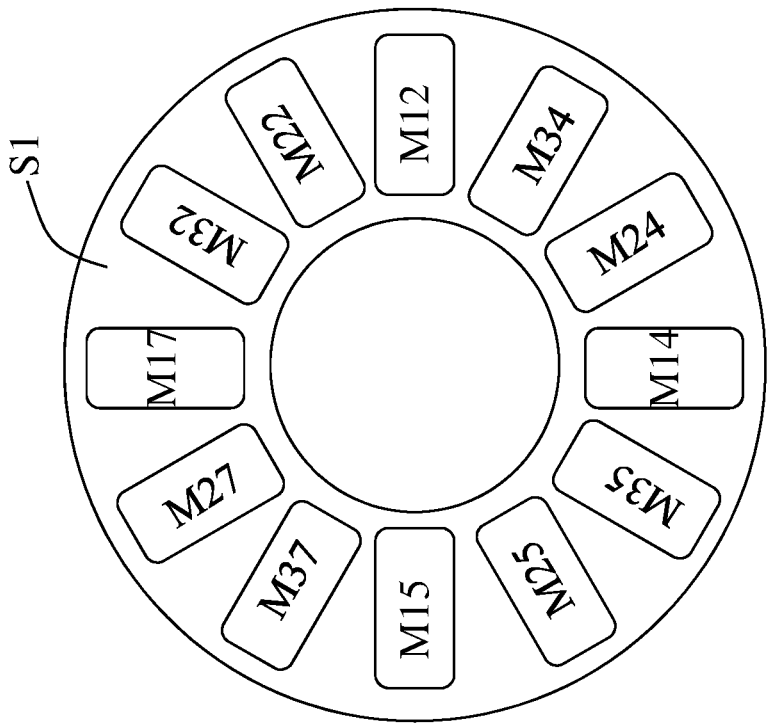

The description relating to fluidic loop B1 of course also applies to the other fluidic loops B2, B3 provided in appliance 1 according to the invention. FIG. 9 represents appliance 1 according to the invention comprising three fluidic loops B1, B2, B3. Each fluidic loop B1, B2, B3, comprises four magnetocaloric elements arranged in first holder S1 (for B1: M12, M17, M15, M14; for B2: M22, M27, M25, M24; for B3: M32, M37, M35, M34) and in front of four other magnetocaloric elements, with which they are directly connected, and arranged on the other holder S2 (for B1: M11, M18, M16, M13; for B2: M21, M28, M26, M23; for B3: M31, M38, M36, M33). Referring to FIG. 11, the two holders S1, S2 have such a geometrical configuration that the magnetocaloric elements have a symmetrical arrangement with respect to the median plane that passes through central magnetic rotor R2. Even though the magnetocaloric elements are represented with a substantially parallelepipedic shape, the invention is not restricted to such magnetocaloric elements geometry. It is possible, as an example, to provide magnetocaloric elements with an arched or V shape.

Figure 10:
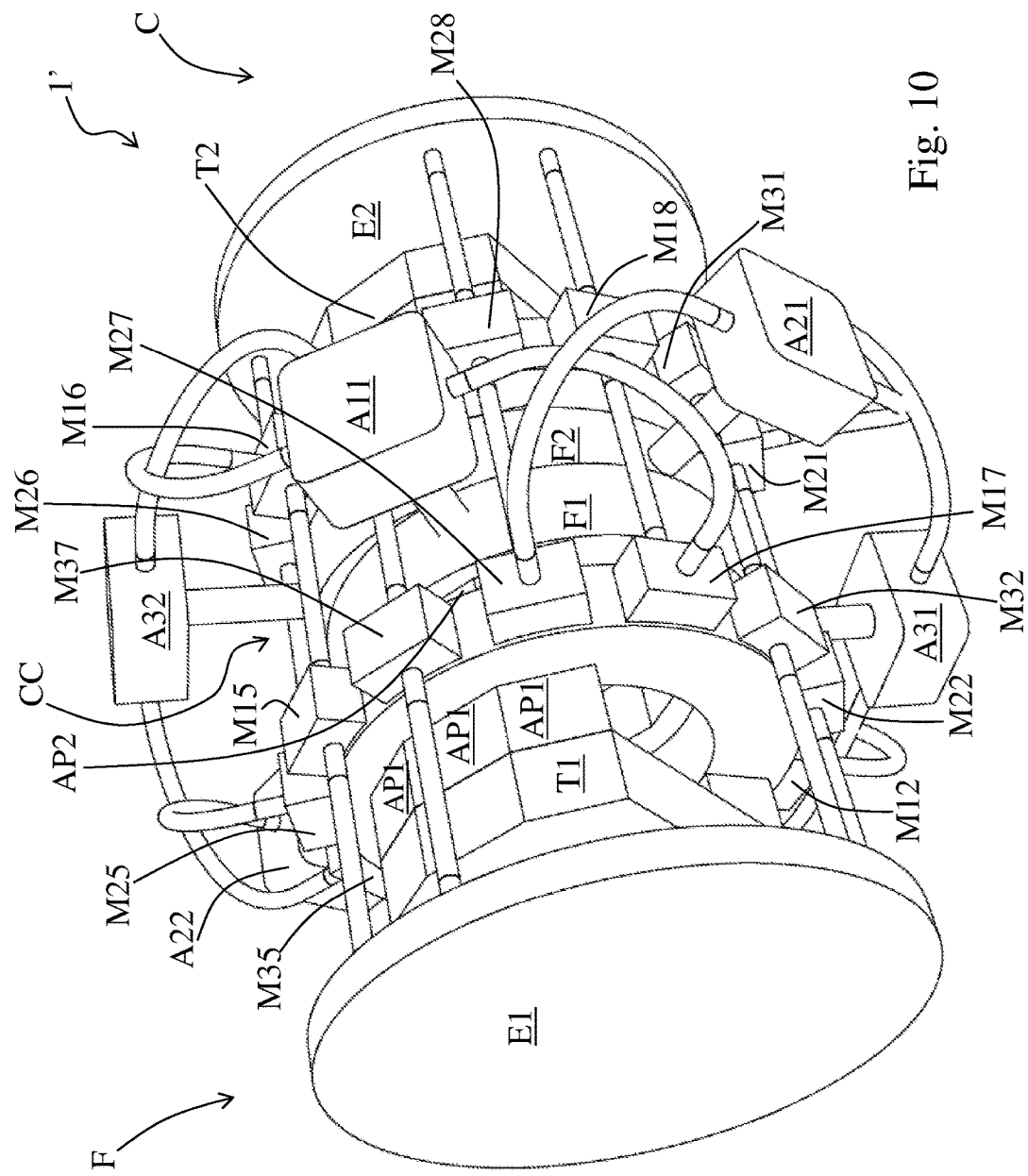
FIG. 10 is a perspective view of a variant of the appliance represented in FIG. 9.

Thermal appliance 1' represented in FIG. 10 differs from that of FIG. 9 only by its heat exchangers. All fluidic loops of this appliance 1' are connected to one single heat exchanger E1 on the cold side and to one single heat exchanger E2 on the hot side.

Indeed, the fluidic loops can be connected to one single common heat exchanger on the hot side and/or on the cold side, or every fluidic loop can be connected to a dedicated heat exchanger on the hot side and/or on the cold side.

As it appears in FIGS. 9 and 10, one single control means in the form of a control cam CC moves all actuators A11, A12, A21, A22, A31, A32 of appliance 1, 1'. Half of the actuators are driven by a first cam profile F1 and the other half are driven by a second cam profile F2. This also appears in FIG. 6, in which actuators A11, A12 of fluidic loop B1 are positioned offset, each actuator being effectively driven by a different cam profile F1, F2. The magnetocaloric elements of holders S1, S2 are arranged symmetrically with respect to the median plane of appliance 1, 1', and each magnetocaloric element of a holder S1, S2 is in fluidic communication with the magnetocaloric element of the other holder S2, S1 located in front of it, as illustrated in FIGS. 6 and 7.

POSSIBILITIES FOR INDUSTRIAL APPLICATION

This description shows clearly that the invention allows reaching the goals defined, that is to say offer a magnetocaloric thermal appliance with a structurally simple and industrializable production. Such appliance can in particular find an application, as well industrial as domestic, in the area of heating, air conditioning, tempering, cooling or others, at competitive costs and with reduced space requirements.

The present invention is not restricted to the examples of embodiment described, but extends to any modification and variant which is obvious to a person skilled in the art while remaining within the scope of the protection defined in the attached claims.

The invention claimed is:

1. A magnetocaloric thermal appliance (1, 1') comprising:
at least three coaxial magnetic rotors (R1, R2, R3) being coupled with an actuator so as to be rotatable about a rotational axis (R), the at least three coaxial magnetic rotors comprise two single faced magnetic rotors (R1, R3) and a double-faced central magnetic rotor (R2) being arranged between the two single-faced magnetic rotors (R1, R3), the at least three coaxial magnetic rotors being provided with diametrally opposed magnetic poles (P), aligned with each other, and delimiting between each other air gaps located in two parallel air gap planes (PE1, PE2),
two holders (S1, S2) for magnetocaloric elements (M11, M12, M13, M14, M15, M16, M17, M18, M21, M22, M23, M24, M25, M26, M27, M28, M31, M32, M33, M34, M35, M36, M37, M38) located in the air gap planes (PE1, PE2),
magnetocaloric elements (M11, M12, M13, M14, M15, M16, M17, M18, M21, M22, M23, M24, M25, M26, M27, M28, M31, M32, M33, M34, M35, M36, M37, M38) being carried by the two holders (S1, S2) and in fluidic communication with each other by fluidic connections,
wherein at least one heat transfer fluid circulates and forms at least one determined fluidic loop (B1, B2, B3), means for displacing the heat transfer fluid through the magnetocaloric elements in the at least one determined fluidic loop (B1, B2, B3) according to a reciprocating forth and back movement as a function of magnetic cycles created by the magnetic rotors,
the fluidic connections connect serially two by two in the at least one determined fluidic loop (B1, B2, B3) the magnetocaloric elements (M11, M12; M13, M14; M15, M16; M17, M18; M21, M22; M23, M24; M25, M26; M27, M28; M31, M32; M33, M34; M35, M36; M37, M38) that belong respectively to the two holders (S1, S2), and the magnetocaloric elements, connected two by two, are in a same magnetic state and positioned in front of each other.

2. The thermal appliance according to claim 1, wherein the at least one determined fluidic loop (B1, B2, B3) comprises first magnetocaloric elements (M17, M14 and M18, M13; M22, M25 and M21, M26; M32, M35 and M31, M36) belonging to every holder (S1, S2) in an identical magnetic state and second magnetocaloric elements (M15, M12 and M11, M16; M24, M27 and M23, M28; M34, M37 and M33, M38) belonging to every holder (S1, S2) in a reversed magnetic state, and displacement means are diametrally opposed and arranged for displacing the heat transfer fluid in two opposite directions.

3. The thermal appliance according to claim 2, wherein the displacement means comprise actuators (A11, A12, A21, A22, A31, A32) positioned centrally with respect to a median plane of the thermal appliance (1, 1') passing through the central magnetic rotor (R2).

4. The thermal appliance according to claim 3, wherein the central magnetic rotor (R2) comprises at least one means (CC) for controlling the actuators (A11, A12; A21, A22; A31, A32).

5. The thermal appliance according to claim 4, wherein the means (CC) for controlling the actuators (A11, A12; A21, A22; A31, A32) comprises at least two cam profiles (F1, F2), and each cam profile is arranged for driving one actuator (A11, A12; A21, A22; A31, A32) of the at least one determined fluidic loop (B1, B2, B3).

6. The thermal appliance according to claim 5, wherein the cam profiles (F1, F2) are identical, but offset by an angle of 90° about the rotational axis (R).

7. The thermal appliance according to claim 1, wherein the thermal appliance comprises several fluidic loops (B1, B2, B3) and the actuators (A11, A12; A21, A22; A31, A32) associated with the fluidic loops are uniformly distributed about the rotational axis (R).

8. The thermal appliance according to claim 1, wherein the magnetocaloric elements, carried by the two holders (S1, S2), are arranged symmetrically with respect to a median plane of the thermal appliance (1, 1') that passes through central magnetic rotor (R2).

9. The thermal appliance according to claim 1, wherein all fluidic loops (B1, B2, B3) are in fluidic communication with a common heat exchanger (E1) at a level of a cold side (F) of the thermal appliance (1') and/or with a common heat exchanger (E2) at a level of a hot side (C) of the thermal appliance (1').

10. The thermal appliance according to claim 1, wherein each fluidic loop (B1, B2, B3) is in fluidic communication with a heat exchanger (E11, E21, E31) that is associated to it at a level of a cold side (F) of the thermal appliance (1) and/or with a heat exchanger (E12, E22, E32) that is associated to it at a level of a hot side (C) of the thermal appliance (1).

11. The thermal appliance according to claim 1, wherein each magnetic rotor comprises at least two pairs of magnetic poles.

* * * * *